United States Patent [19]

Bloodworth et al.

[11] Patent Number: 5,735,946
[45] Date of Patent: Apr. 7, 1998

[54] TWO-STAGE PROCESS FOR DELAMINATING KAOLIN

[75] Inventors: J. Elmo Bloodworth, Milledgeville; John H. Chapman, Sandersville; Sam M. Pickering, Jr., Macon, all of Ga.; Michael A. Linkous, Raleigh, N.C.

[73] Assignee: U.S. Borax, Inc., Valencia, Calif.

[21] Appl. No.: 645,880

[22] Filed: May 14, 1996

[51] Int. Cl.⁶ ............................. C09C 1/42; C04B 14/10
[52] U.S. Cl. .................. 106/486; 106/484; 241/22; 241/24.1; 241/24.14; 241/24.23
[58] Field of Search ........................... 106/484, 486, 106/487, 488; 252/188.1, 188.22; 241/22, 24.1, 24.14, 24.23; 209/214

[56] References Cited

U.S. PATENT DOCUMENTS

| | | | |
|---|---|---|---|
| 3,075,710 | 1/1963 | Feld et al. | 241/16 |
| 3,171,718 | 3/1965 | Gunn et al. | 23/110 |
| 3,313,492 | 4/1967 | Jacobs et al. | 241/21 |
| 3,398,008 | 8/1968 | Jacobs et al. | 106/288 |
| 3,635,662 | 1/1972 | Lyons | 23/110 R |
| 3,667,689 | 6/1972 | Whitley et al. | 241/15 |
| 3,743,190 | 7/1973 | Whitley | 241/4 |
| 3,798,044 | 3/1974 | Whitley et al. | 106/288 B |
| 4,118,245 | 10/1978 | Hamill et al. | 106/288 B |
| 4,561,597 | 12/1985 | Cook et al. | 241/17 |
| 5,011,534 | 4/1991 | Berube et al. | 106/416 |
| 5,112,782 | 5/1992 | Brown et al. | 501/144 |
| 5,168,083 | 12/1992 | Matthews et al. | 501/146 |
| 5,169,443 | 12/1992 | Willis et al. | 106/486 |
| 5,261,956 | 11/1993 | Bunaway et al. | 106/416 |
| 5,379,948 | 1/1995 | Teppo | 241/24 |
| 5,393,340 | 2/1995 | Slepetys et al. | 106/484 |
| 5,411,587 | 5/1995 | Willis et al. | 106/486 |

*Primary Examiner*—Michael Marcheschi
*Attorney, Agent, or Firm*—Myers Bigel Sibley & Sajovec

[57] ABSTRACT

A method for producing a delaminated kaolin clay having a G.E. brightness of at least 85, a solids content of at least 67 percent by weight, and a viscosity below 500 cps is disclosed. An aqueous slurry of kaolin clay is subjected to agitation in the presence of a hard grinding media. The slurry is then subjected to agitation in the presence of a soft grinding media. The result is that at least 80 percent of the delaminated kaolin has an equivalent spherical diameter of less than or equal to 2 microns.

20 Claims, 5 Drawing Sheets

TWO-STAGE PROCESS FOR DELAMINATING KAOLIN

FIELD OF THE INVENTION

The present invention relates to kaolin, and more particularly to a process for delaminating kaolin.

BACKGROUND OF THE INVENTION

The term "kaolin" as it is used herein relates to near-white clay deposits which are dominantly comprised of the mineral kaolinite having the formula $Al_4Si_4O_{10}(OH)_8$, possibly with lesser amounts of the kaolin-group mineral, halloysite. Kaolin is white in color, has a generally small particle size, and is relatively chemically inert. As a result, kaolin is used in the paper industry as both a filler and a coating. When used as a filler or coating, kaolin must have a high solids content (generally between about 50% and 70% by weight), yet exhibit a viscosity low enough to permit efficient and economical pumping, mixability with other filler or coating components, and application to the paper. In addition, it is important that the kaolin maintain a sufficiently high brightness.

In general, kaolin particles smaller than about 2 microns in size are composed of individual, flat, hexagonal platelets. Kaolin particles larger than about 2 microns are typically aggregations, known as "stacks", comprising numerous platelets bonded together in a face-to-face fashion. Crude kaolin clay deposits typically include a mixture of stacks and individual platelets.

It is well known that kaolin particles smaller than about 2 microns are superior to larger kaolin particles with respect to brightness and smoothness. Unfortunately, kaolin particles smaller than 2 microns occur sparingly in nature. As a result, various methods for breaking up kaolin stacks have been developed. One such method, "delamination", involves imparting a shearing force sufficient to cleave apart individual platelets from a stack along the basal cleavages without fracturing the platelets.

Various ways of delaminating kaolin are known. For example, U.S. Pat. No. 3,171,718 to Gunn et al. describes a delaminating process wherein an aqueous slurry of kaolin and a fine, non-abrasive grinding media, such as nylon beads or pellets, are rapidly agitated. Delaminating techniques employing "soft" media produce a high quality, low abrasive delaminated kaolin product. Unfortunately, delaminating techniques employing soft media suffer from slow grinding rates, relatively low yield rates, and higher production costs.

Delaminating kaolin with a hard grinding medium, such as sand, is described in U.S. Pat. No. 3,075,710 to Feld et al. The primary advantage of a hard grinding media is that higher yields can be obtained as compared with soft grinding media. Unfortunately, the use of hard grinding media degrades brightness. This is because impurities present, such as iron oxide and titanium, are ground by the hard media to a small particle size that cannot be removed easily during classification (the separation of particles based on their size). Magnetic separation techniques are used to remove iron-based impurities; however, this additional step is costly and increases the processing time.

In addition, kaolin delaminated with a hard grinding media often has an unacceptably high viscosity. High viscosity kaolin is difficult to handle and to use, causes slower production speeds, and consequently lower efficiency and higher costs. As a result, the paper industry currently must balance the tradeoff between quality and production efficiency.

SUMMARY OF THE INVENTION

It is therefore an object of the present invention to produce delaminated kaolin having both a high solids content and an acceptably low viscosity.

It is another object of the present invention to produce delaminated kaolin having high brightness.

It is another object of the present invention to achieve a high product yield of delaminated kaolin having high brightness, high solids content, and acceptable viscosity.

These and other objects are provided, according to the present invention, by a method for producing delaminated kaolin clay having a G.E. brightness of at least about 85, a solids content of at least about 67 percent by weight, and a viscosity below about 500 centipoise (cps) at 20 rpm Brookfield. Accordingly, an aqueous slurry of kaolin clay is subjected to agitation in the presence of a hard grinding media and then to agitation in the presence of a soft grinding media. The aqueous slurry is typically a dispersed kaolin clay-water slurry. At least about 80 percent of the delaminated kaolin has an equivalent spherical diameter (e.s.d.) of less than or equal to 2 microns.

The hard grinding media may include sand, glass, alumina, and zirconia. The soft grinding media may be plastic, such as nylon or styrene. The aqueous slurry of kaolin clay is subjected to agitation in the presence of a hard grinding media for between about 5 and 20 minutes. The aqueous slurry of kaolin clay is then subjected to agitation in the presence of a soft grinding media for between about 5 and 20 minutes.

Coarse material may be removed from the kaolin via degritting techniques prior to agitation with the hard and soft grinding media. Additional processing steps may include fractionating, removing contaminants, and leaching. These steps are often performed after agitation with the hard and soft grinding media.

Often the contaminants are iron oxide minerals and the step of removing the contaminants comprises subjecting the kaolin to a magnetic field.

According to another aspect of the present invention, a method for producing a delaminated mineral having a G.E. brightness of at least about 85, a solids content of at least about 67 percent by weight, and a viscosity below about 500 cps, is disclosed. Initially, the mineral is blunged to a 20 to 70 percent solids slurry, followed by a degritting step. Next, the slurry is subjected to agitation in the presence of a grinding media harder than the mineral, followed by agitation in the presence of a grinding media softer than the mineral. Finally, the delaminated slurry is subjected to various processes including fractionation, magnetic fields, and reductive leaching. As a result, at least 80 percent of the delaminated mineral has an e.s.d. of less than or equal to about 2 microns.

The present invention is advantageous because it decreases the time required to delaminate kaolin to achieve desired viscosity and brightness characteristics. Furthermore, significant increases in product yields are achievable while maintaining acceptable solids content.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As is known to those having skill in the art, when kaolin is used as a paper filler or coating, it preferably has a solids content between about 67 percent and 70 percent by weight, and a viscosity less than 1000 centipoise (cps or cpe), when measured by a Brookfield viscometer at 20 rpm. Even more preferably is a solids content of between 67 percent and 70 percent by weight, and a viscosity less than 500 cps. In addition, the preferred G.E. (Tappi) brightness of kaolin, when used as a filler or coating for paper, is about 85. By comparison, crude kaolin has a G.E. brightness of between about 50 and 75.

Figure 1:
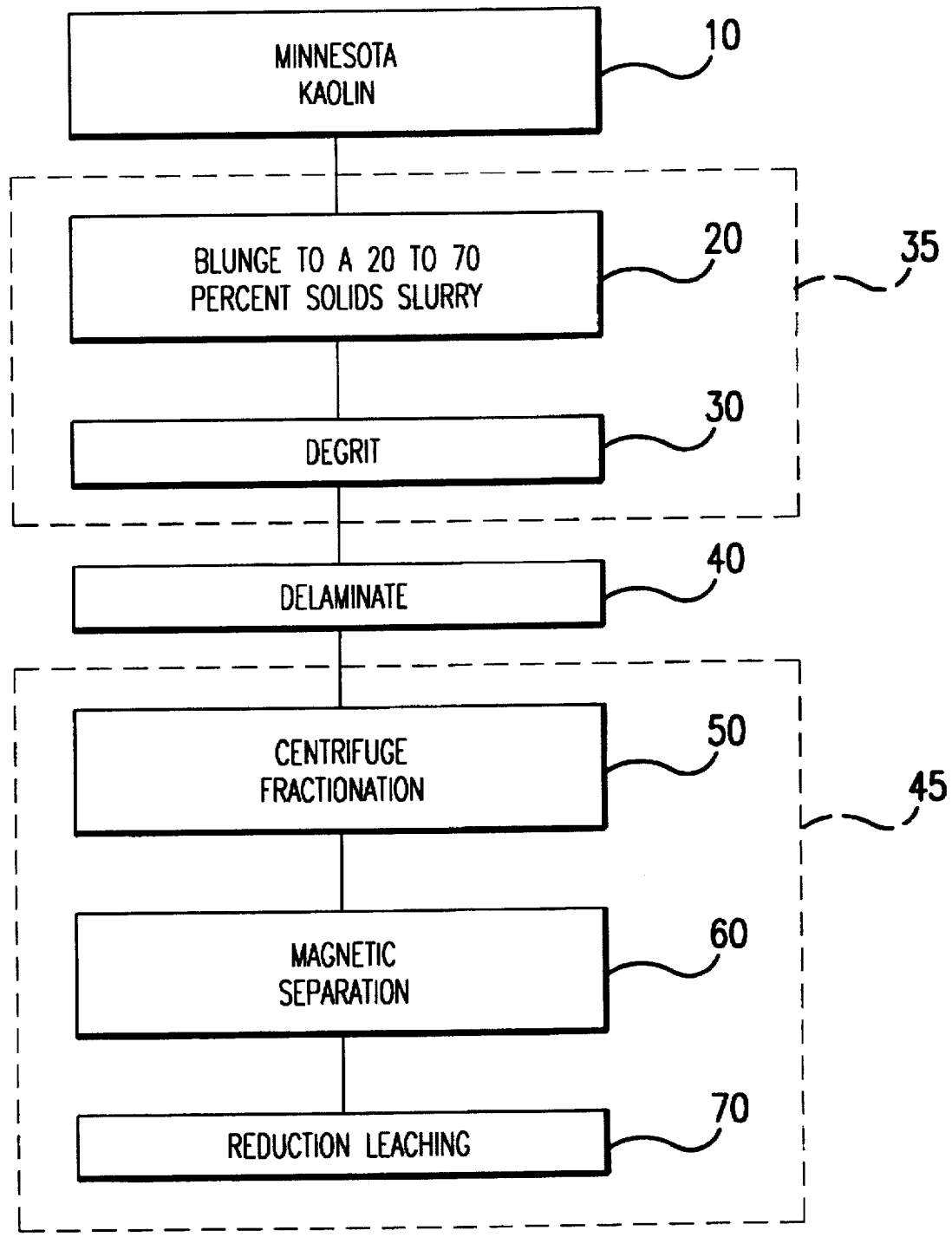
FIG. 1 is a flow chart illustrating conventional kaolin processing.

Referring now to FIG. 1, a conventional process for producing kaolin or other minerals for use as a paper filler or coating is schematically illustrated. Crude kaolin 10, such as Minnesota kaolin, is blunged 20 to a 20 percent to 70 percent solids slurry. The crude kaolin is typically dispersed or deflocculated in water with the aid of a dispersing agent to form a slurry suitable for pumping. Suitable dispersing agents are well known in the kaolin beneficiation art and include polyphosphates, carbonates, silicates, inorganic alkalis, and salts, and mixtures thereof. The dispersing agents may be used in combination with ionic salts such as sodium chloride, sodium sulfate, etc. A specific dispersant is a mixture of ⅔ sodium hexametaphosphate (CALGON® brand dispersant) and ⅓ soda ash ($Na_2CO_3$).

The slurry then undergoes one or more known techniques for removing impurities, i.e., the slurry is degritted 30, delaminated 40, submitted to centrifuge fractionation 50, magnetic separation 60, and reduction leaching 70. It is recognized that the selection of, and the order of practicing, these techniques are within the skill of one in the art. Conventional kaolin processing techniques typically, individually or collectively, improve G.E. brightness by an amount of only between about 0.5 and 12 points above the G.E. brightness of crude kaolin.

Degritting 30 comprises passing the slurry through a screen, e.g., a U.S. standard 100 mesh screen, to remove coarse or abrasive material (e.g., quartz) that is not a part of the kaolin. Preferably, after degritting, the kaolin is then subjected to delamination 40 wherein kaolin stacks are disaggregated into individual platelets by parting aggregated crystals along their basal cleavages. Delamination involves the use of grinding media to break apart stacks of kaolin particles, into individual platelets of a desired thickness and diameter. The size of a kaolin particle is designated by the term "equivalent spherical diameter" and is measured in microns. Both the kaolin stacks and grinding media are typically suspended in an aqueous solution during the delamination process. In addition, dispersants are often added to the aqueous solution for pH control and for various other reasons known to those having skill in the art.

Often one or more classification or fractionation steps 50 are performed before and/or after delamination to remove oversize particles and to provide a slurry having a particle size distribution of at least 60 percent by weight of particles less than 2 microns in e.s.d.

Other post-delamination steps may be performed, such as magnetic separation, filtration, bleaching, and drying. Preferably after fractionation, the slurry is subjected to magnetic separation 60 to remove at least a portion of any iron-based impurities (e.g., iron or iron-titanium oxides). Typically, the slurry is then leached 70 with a conventional leaching agent, such as zinc hydrosulfite or sodium hydrosulfite. The techniques up to this point are conventional and are primarily subtractive in nature.

It is known to delaminate kaolin using either a hard grinding media or a soft grinding media. See, for example, U.S. Pat. No. 5,169,443 to Willis et al. Heretofore, however, it has been unknown to delaminate kaolin using a two-stage process according to the present invention. Applicants have unexpectedly discovered an improved method of delaminating kaolin that achieves a high product yield, high brightness, and acceptable viscosity while also maintaining high solids content.

Figure 2:
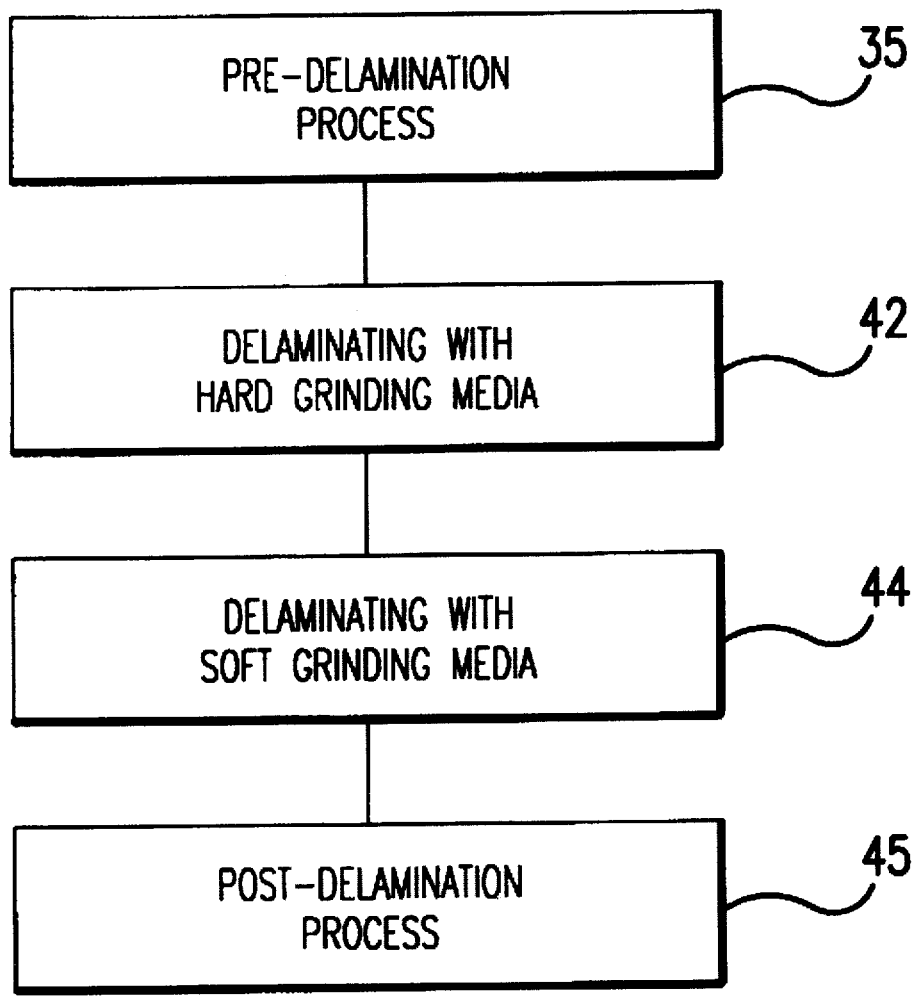
FIG. 2 is a flow chart illustrating two-stage delaminating according to the present invention.

Referring to FIG. 2, the two-stage delaminating process, according to the present invention is schematically illustrated. A kaolin slurry, after being subjected to various pre-delamination processing 35, is subjected to a first delamination stage 42 by agitating the slurry with a grinding media having a hardness greater than the kaolin. Preferable hard grinding media include, but are not limited to, sand, glass, alumina, zirconia, and CARBOLITE® brand grinding media (a registered trademark of the Mullite Company of America). Next, the slurry is subjected to a second delamination stage 44 wherein the slurry is agitated with a grinding media that is softer than the kaolin. Preferable soft grinding media include, but are not limited to, nylon and various plastics. A first delaminating stage utilizing a hard grinding media followed by a second delaminating stage utilizing a soft grinding media, according to the present invention, results in brightness and viscosity heretofore unobtained by known delamination techniques.

Preferably, after the two-stage process, delaminated kaolin has a G.E. brightness of at least 85, a solids content of at least 67 percent by weight, and a viscosity less than 500 cps. Preferably, delamination times are adjusted such that at least 80 percent of the kaolin has an e.s.d. of less than or equal to 2 microns. Subsequent to the step of delaminating with a soft grinding media, various post-delamination processes 45 can be performed.

Figure 3A:
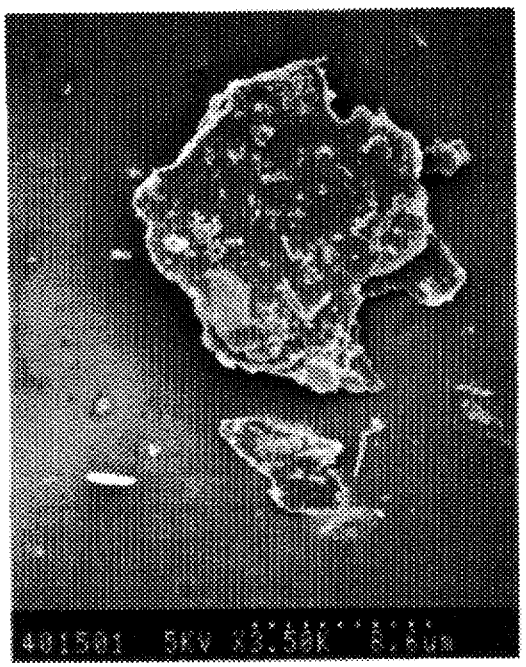
FIG. 3A is a micrograph illustrating a kaolin stack.
Figure 3B:
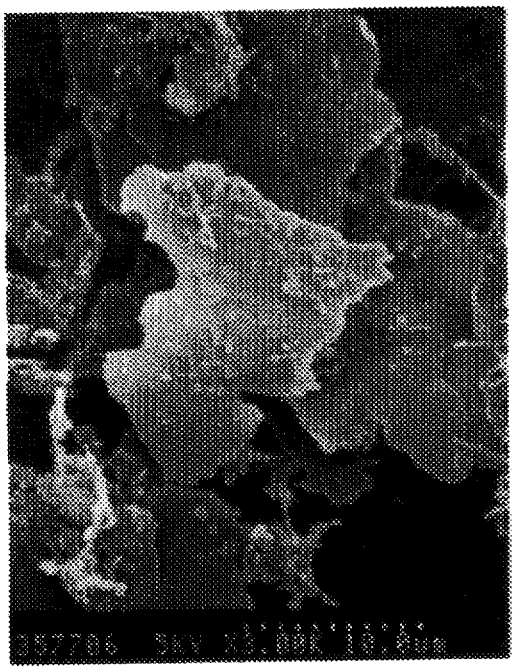
FIG. 3B is a micrograph illustrating a kaolin stack delaminated with a hard grinding media.

Referring now to FIGS. 3A–3D, the effect of hard and soft grinding media on kaolin platelets will be explained in greater detail. FIG. 3A illustrates a kaolin stack comprised of multiple small platelets bonded together, one on top of the other. FIG. 3B illustrates the effect of delaminating kaolin stacks with a hard grinding media, such as CARBOLITE® brand grinding media. In general, a hard grinding media has a detrimental effect on viscosity because it breaks the platelets apart from one another and also bends the edges of the platelets. As a result, the edges of the individual platelets become jagged. Consequently, the viscosity of the kaolin is unacceptably high because platelets with jagged edges will not move as readily among one another as will platelets having smooth edges. Delaminating kaolin with a hard grinding media is beneficial, however, in that a number of large platelets are produced. Large platelets increase opacity when kaolin is used as a paper coating.

Figure 3C:
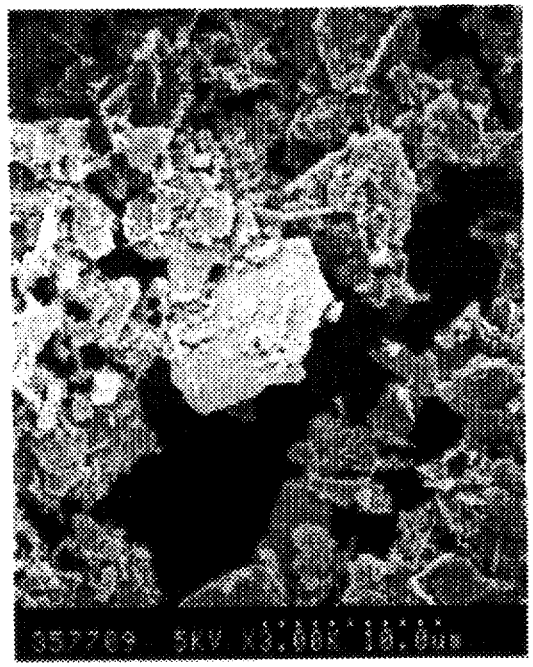
FIG. 3C is a micrograph illustrating a kaolin stack delaminated with a soft grinding media.

Delamination with a soft grinding media, such as nylon, is illustrated in FIG. 3C. Using soft grinding media to delaminate kaolin is typically undesirable because it produces smaller platelets than hard grinding media delamination. Consequently, when used as a paper coating, kaolin comprised of small platelets is inferior to kaolin comprised of large platelets because it has lower opacity. An additional drawback of delaminating with soft grinding media is that it takes a long time to produce delaminated kaolin of sufficient quality.

However, delaminating with a soft grinding media does produce platelets having smoother edges. The soft grinding media burnishes the cleavage plate of each platelet, thereby producing a smooth edge. When platelets have smooth edges they move more readily, thereby lowering viscosity. Furthermore, soft grinding media does not grind up the impurities present as readily as a hard grinding media. Consequently, brightness is not impaired.

Figure 3D:
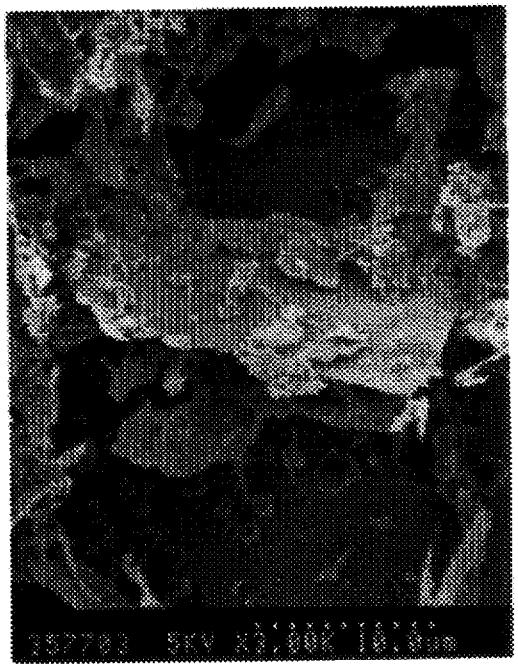
FIG. 3D is a micrograph illustrating a kaolin stack delaminated with both a hard and soft grinding media according to the present invention.

Kaolin platelets delaminated using a two-stage process according to the present invention is illustrated in FIG. 3D. As clearly can be seen, both large and small platelets are produced, thereby making acceptable opacity possible. In addition, the edges of all the platelets are smooth, thus keeping viscosity at an acceptably low level. The soft grinding media repairs the damage to viscosity caused by the hard grinding media by burnishing the edges of each platelet.

In operation, any conventional tank or vessel equipped with agitators may be employed in both delaminating steps. Suitable delaminating devices for both hard and soft grinding media are described in U.S. Pat. No. 3,171,718 to Gunn et al. Preferably, the agitator system is designed to impart the necessary energy to overcome the Van der Waals forces holding the individual platelets in stacks. However, the energy required to delaminate kaolin may vary depending on the type of crude, the equipment, and process conditions.

The two-stage delaminating process, according to the present invention, can be carried out as a batch operation or as a continuous process. Preferably, both delamination stages 42,44 are carried out in a continuous process. However, in either batchwise or continuous operation, agitation of the grinding media in the kaolin suspension is sufficient to produce delamination. In each stage, the delamination process can be continued for any length of time desirable until the coarse kaolin stacks are delaminated and converted into platelets of the desired or specified particle size. However, as is known to those having skill in the art, delamination times are dependent on various parameters including grinding media size, specific gravity, solids content, and intensity of agitation.

The invention will be illustrated further in the following Examples, which should, however, be considered exemplary only of the invention, and not delimitative of the characteristics otherwise set forth.

EXAMPLE 1

Figure 4A:
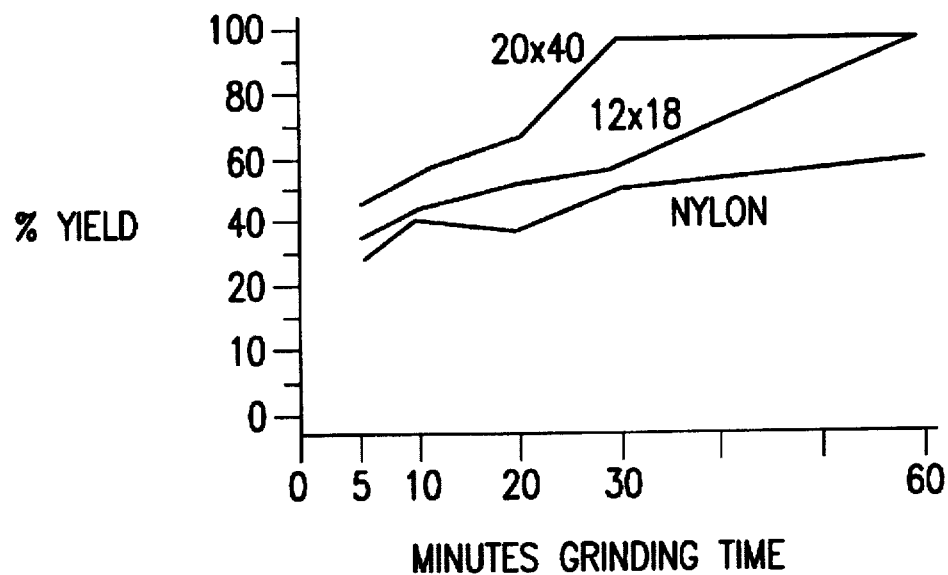
FIG. 4A illustrates the time required to delaminate kaolin with various grinding media.

This Example illustrates the time required to achieve different yields of delaminated kaolin with different grinding media. Referring now to FIG. 4A, delamination was performed using a two-to-one (2:1) ratio of grinding media to kaolin clay slurry on a volume-to-volume basis. The delaminated end-product comprises approximately 80 percent kaolin particles having an e.s.d. of less than 2 microns. The "12×18" line represents the yield from delaminating, over time, with a CARBOLITE® brand ceramic bead grinding media of 12 to 18 mesh size. The "20×40" line represents the yield from delaminating, over time, with a CARBOLITE® brand ceramic bead grinding media of 12 to 18 mesh size. The nylon line represents the yield from delaminating, over time, with nylon grinding media having a generally one-eighth inch by one-eighth inch cylindrical configuration.

Analysis of the three yield lines indicates that the 20 to 40 mesh CARBOLITE® brand ceramic bead grinding media produces the highest yield of delaminated kaolin in the shortest period of time. The 12 to 18 mesh CARBOLITE® brand ceramic bead grinding media produces the next highest yield of delaminated kaolin in the same period of time. The nylon grinding media produces the lowest yield of delaminated kaolin in the same period of time.

EXAMPLE 2

Figure 4B:
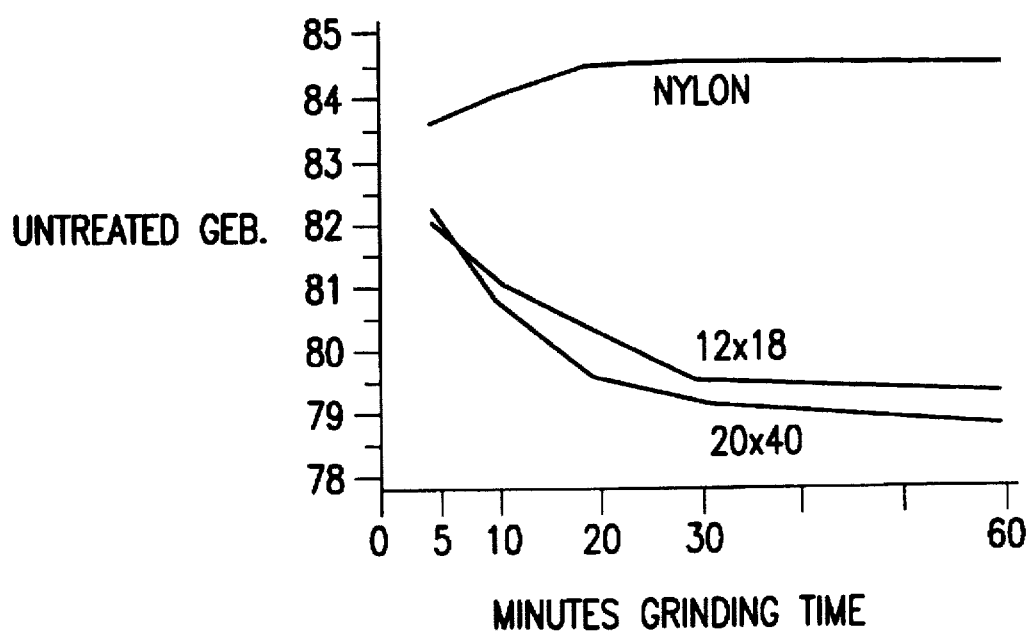
FIG. 4B illustrates G.E. brightness of kaolin delaminated with various grinding media.

This Example illustrates the pigment brightness of kaolin delaminated by the same grinding media described previously. Referring now to FIG. 4B, brightness was determined in the conventional manner (TAPPI procedure 649 05-75) using a G.E. Brightness meter. The "12×18" line represents the G.E. brightness from delaminating, over time, with a CARBOLITE® brand ceramic bead grinding media of 12 to 18 mesh size. The "20×40" line represents the G.E. brightness from delaminating, over time, with a CARBOLITE® brand ceramic bead grinding media of 12 to 18 mesh size. The nylon line represents the G.E. brightness from delaminating, over time, with nylon grinding media having a generally one-eighth inch by one-eighth inch cylindrical configuration.

Analysis of the three brightness lines indicates that the 20 to 40 mesh CARBOLITE® brand ceramic bead grinding media produces delaminated kaolin having the lowest brightness over time. The 12 to 18 mesh CARBOLITE® brand ceramic bead grinding media produces delaminated kaolin having the next lowest brightness over the same period of time. The nylon grinding media produces delaminated kaolin with the highest brightness over the same period of time. In fact, the brightness of delaminated kaolin actually increased over time when the nylon grinding media was used.

EXAMPLE 3

Figure 4C:
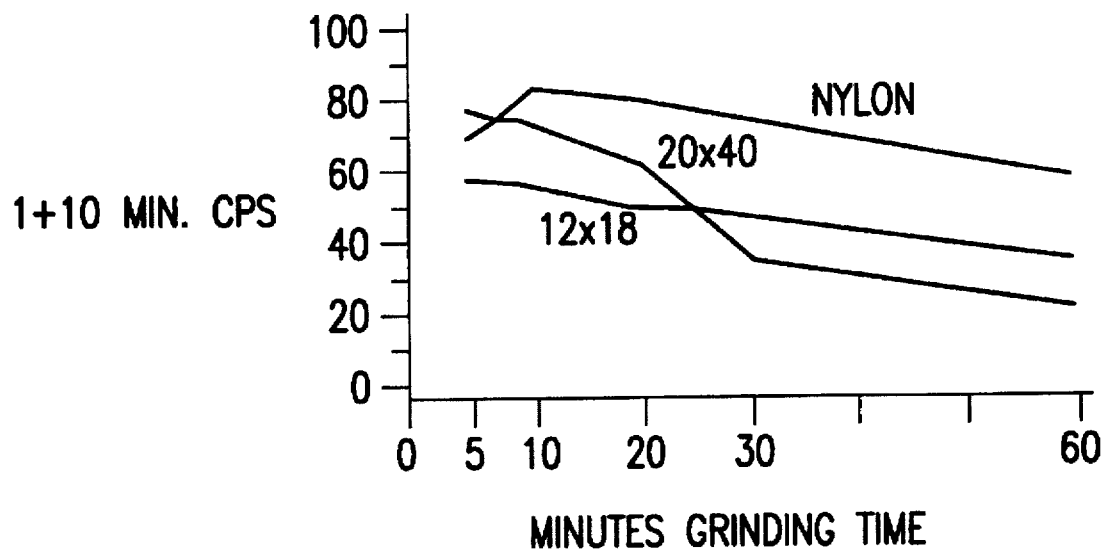
FIG. 4C illustrates the particle size of kaolin delaminated with various grinding media.

In this Example, kaolin particle size, as measured by simplified particle size measurement (cc of sediment at 1 and 10 minutes cps) attained from each of the grinding media is illustrated. Referring now to FIG. 4C, the "12×18" line represents the kaolin particle size, over time, with a CARBOLITE® brand ceramic bead grinding media of 12 to 18 mesh size. The "20×40" line represents the kaolin particle size, over time, with a CARBOLITE® brand ceramic bead grinding media of 12 to 18 mesh size. The nylon line represents the kaolin particle size, over time, with nylon grinding media having a generally one-eighth inch by one-eighth inch cylindrical configuration.

Analysis of the three lines indicates a substantial improvement in particle size reduction when using the hard grinding media, CARBOLITE® brand ceramic beads having "12×18" and "20×40" mesh. The nylon grinding media does not appreciably reduce particle size over time.

EXAMPLE 4

Figure 4D:
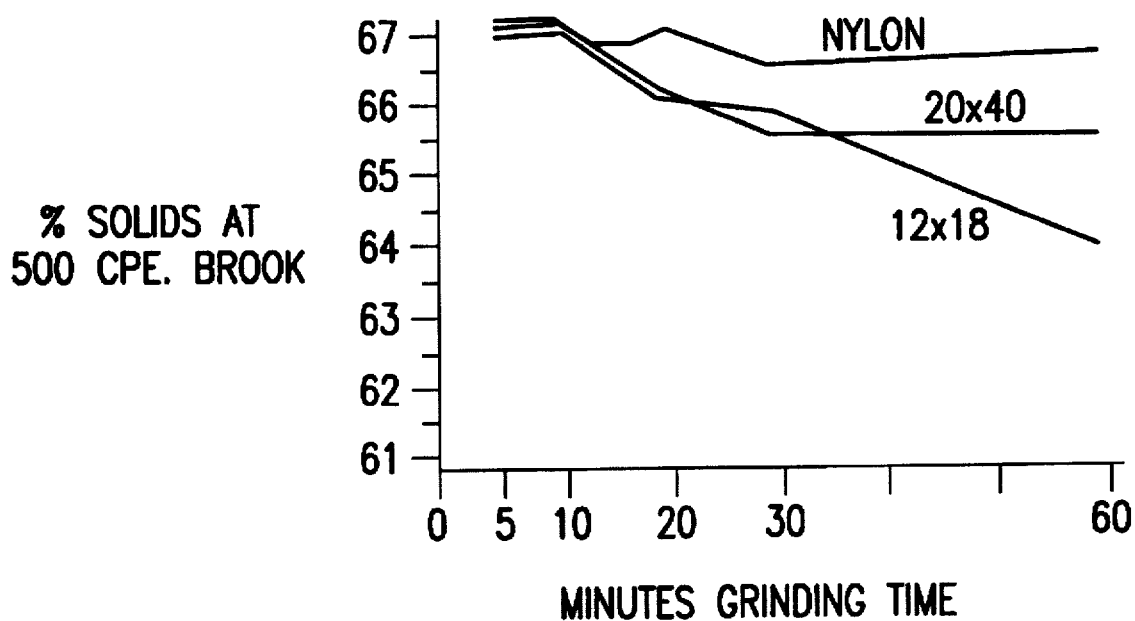
FIG. 4D illustrates the viscosity of kaolin delaminated with various grinding media.

This Example illustrates the effect on kaolin viscosity using the various grinding media. Referring now to FIG. 4D, the "12×18" line represents the percentage of solids content at 500 cps Brookfield viscosity, over time, of kaolin delaminated with a CARBOLITE® brand ceramic bead grinding media of 12 to 18 mesh size. The "20×40" line represents the percentage of solids content at 500 cps Brookfield viscosity, over time, of kaolin delaminated with a CARBOLITE® brand ceramic bead grinding media of 12 to 18 mesh size. The nylon line represents the percentage of solids content at 500 cps Brookfield viscosity, over time, of kaolin delaminated with nylon grinding media having a generally one-eighth inch by one-eighth inch cylindrical configuration.

EXAMPLE 5

The apparatus used to delaminate kaolin with the two-stage method of the present invention was an 8 inch diameter by 12 inch high cylinder constructed of polyvinyl chloride (PVC). A 7 inch diameter stainless steel rotor comprising a 1 inch diameter rod with a series of 6 rods each having a diameter of one-half inch connected thereto was used. The rotor was turned by a drill press at 350 revolutions per minute (rpm) during the entire delamination process. The kaolin was ground for the specified time and then screened to remove the grinding media. The kaolin portion was then classified to a specified particle size product and processed further using standard processing techniques.

For the first two-stage trial, a slip of crude kaolin was ground for 20 minutes using CARBOLITE® brand hard grinding media, followed by 20 minutes of grinding using nylon soft grinding media. The result was a sixty percent (60%) delaminated product recovery with 540 cps Brookfield viscosity having sixty-seven percent (67%) solids and a leached G.E. brightness of 91.5 without magnetic separation. Brookfield viscosity was measured using TAPPI procedure at 20 rpm using the #3 spindle. Brightness was measured in accordance with TAPPI procedure 649 05-75 using a G.E. brightness meter.

As is readily apparent, there is a significant improvement in viscosity at desired levels of solids content using the two-stage process of the present invention. The advantages of the present invention, therefore, are collectively: high yield, low grinding times, acceptable viscosity and high brightness. Although kaolin is a preferred mineral in the paper industry, it shall be understood that the present invention is applicable to any and all minerals capable of being delaminated.

Referring now to Table 1, the present invention offers a great deal of flexibility with respect to grinding media combinations and grinding times, in order to produce an acceptable product with sufficient product yield. The optimum process appears to be a 20 minute grind using the 30–50 mesh CARBOLITE® brand media followed by classification to a product having 80 percent less than 2 microns e.s.d. Product yield for this process is 66 percent with a Brookfield viscosity of 370 cps at 430 rpm and 67 percent solids.

Still referring to Table 1, product yield can be improved significantly by: 1) delaminating with the CARBOLITE® brand grinding media until a product having 70 percent less than 2 microns e.s.d. is achieved; 2) delaminating with nylon; and 3) classifying to a product having 80 percent less than 2 microns e.s.d. This process produces a product yield of 87 percent with a Brookfield viscosity of 425 cps at 420 rpm and 67 percent solids.

TABLE 1

| | | | | | | | PRODUCT | | | | | |
| | | | | | | | | | | COATING | | |
| | | | | | | | VISCOSITY | | | 1 | 3 | |
| | | GROUND C.P.S | D.P.S | % <2µ | % YIELD | BR. | 20 RPM BROOK | 1100 HERC. | % SOL. | SHEET BA. | SHEET BA. | OPAC | COAT WGT. |
|---|---|---|---|---|---|---|---|---|---|---|---|---|---|
| A | CONTROL, NO GRIND | | .05–.20 | 83 | 17.7 | | | | | 82.8 | 88.5 | 93.5 | 1.2 |
| B | NYLON GRIND, 10 MIN. | .38–.60 | .04–.29 | 86 | 26.6 | 92.6 | 425 | 545 | 67 | 83.3 | 88.0 | 94.7 | 1.2 |
| C | NYLON GRIND, 20 MIN. | .28–.59 | .03–.29 | 86 | 35.1 | 92.7 | 450 | 540 | 67 | 82.4 | 88.3 | 93.3 | 1.2 |
| D | NYLON GRIND, 30 MIN. | .20–.55 | .02–.27 | 88 | 43.5 | 92.8 | 350 | 540 | 66.4 | 82.6 | 88.6 | 93.2 | 1.2 |
| E | CARBOLITE GRIND, 10 MIN | .20–.50 | .05–.25 | 85 | 38.3 | 92.1 | 410 | 940 | 67 | 82.2 | 88.0 | 93.4 | 1.2 |
| F | CARBOLITE/NYLON, 10/10 | .18–.49 | .03–.30 | 86 | 60.5 | 92.7 | 380 | 615 | 67 | 82.6 | 88.2 | 93.7 | 1.2 |
| G | CARBOLITE/NYLON, 10/20 | .09–.49 | .02–.29 | 88 | 62.3 | 93.0 | 375 | 390 | 67 | 83.7 | 88.5 | 94.6 | 1.2 |
| H | CARBOLITE/NYLON, 10/30 | .07–.42 | .03–.30 | 87 | 64.8 | 92.5 | 375 | 335 | 67 | 82.3 | 87.7 | 93.9 | 1.2 |
| I | CARBOLITE 10 - 70% <2 - NYLON 10 - 80% <2 | .07–.43 | .04–.28 | 85 | 48 | 92.9 | 380 | 525 | 67 | 82.9 | 88.1 | 94.2 | 1.2 |
| J | CARBOLITE 10 - 70% <2 - NYLON 20 - 80% <2 | .06–.39 | .04–.30 | 83 | 51.1 | 92.7 | 350 | 375 | 67 | 83.0 | 88.1 | 94.0 | 1.2 |
| K | CARBOLITE 10 - 70% <2 - NYLON 30 - 80% <2 | .05–.30 | .04–.28 | 83 | 54.8 | 92.5 | 400 | 400 | 67 | 83.2 | 88.0 | 94.5 | 1.2 |
| L | CARBOLITE GRIND, 20 MIN. | .18–.42 | .03–.29 | 82 | 66.0 | 92.7 | 370 | 430 | 67 | 83.9 | 88.1 | 95.0 | 1.2 |
| M | CARBOLITE/NYLON, 20/10 | .18–.49 | .04–.30 | 84 | 61.8 | 92.4 | 375 | 265 | 67 | 82.3 | 87.9 | 93.7 | 1.2 |
| N | CARBOLITE/NYLON, 20/20 | .10–.48 | .03–.29 | 87 | 60.3 | 92.6 | 425 | 395 | 67 | 82.9 | 88.2 | 94.0 | 1.2 |
| O | CARBOLITE/NYLON, 20/30 | .09–.43 | .04–.32 | 83 | — | 92.2 | 375 | 380 | 66.6 | 82.8 | 88.1 | 94.0 | 1.2 |
| P | CARBOLITE 20 - 70% <2 - NYLON 10 - 80% <2 | .09–.40 | .05–.33 | 78 | 64.6 | 92.5 | 380 | 325 | 67 | 82.8 | 88.0 | 93.5 | 1.2 |
| Q | CARBOLITE 20 - 70% <2 - NYLON 20 - 80% <2 | .08–.40 | .04–.30 | 82 | 60.1 | 92.3 | 425 | 315 | 67 | 83.5 | 88.4 | 94.7 | 1.2 |
| R | CARBOLITE 20 - 70% <2 - NYLON 30 - 80% <2 | .06–.37 | .04–.37 | 75 | 73 | 91.4 | 400 | 285 | 67 | 82.0 | 87.8 | 93.4 | 1.2 |
| S | CARBOLITE GRIND, 30 MIN. | .18–.42 | .05–.30 | 80 | 66.3 | 92.8 | 425 | 315 | 67 | 82.4 | 87.7 | 93.9 | 1.2 |
| T | CARBOLITE/NYLON, 30/10 | .10–.48 | .03–.29 | 86 | 77.6 | 93.1 | 440 | 410 | 66.5 | 82.4 | 88.0 | 93.6 | 1.2 |

TABLE 1-continued

| | | | | | | | PRODUCT | | | | | |
| | | | | | | | | | COATING | | | |
| | | | | | | | VISCOSITY | | 1 | 3 | | |
| | | GROUND C.P.S | D.P.S | % <2μ | % YIELD | BR. | 20 RPM BROOK | 1100 HERC. | % SOL. | SHEET BA. | SHEET BA. | OPAC | COAT WGT. |
|---|---|---|---|---|---|---|---|---|---|---|---|---|---|
| U | CARBOLITE/NYLON 30/20 | .10–.48 | .04–.32 | 83 | 74.2 | 92.9 | 480 | 415 | 67 | 82.8 | 88.3 | 93.8 | 1.2 |
| V | CARBOLITE/NYLON, 30/30 | .11–.47 | .05–.32 | 81 | 70.6 | 92.5 | 555 | 280 | 67 | 81.9 | 88.0 | 93.1 | 1.2 |
| W | CARBOLITE 30 - 70% <2 - NYLON 10 - 80% <2 | .09–.41 | .03–.29 | 85 | 82.1 | 92.7 | 425 | 440 | 67 | 82.0 | 88.0 | 93.3 | 1.2 |
| X | CARBOLITE 30 - 70% <2 - NYLON 20 - 80% <2 | .09–.43 | .04–.30 | 83 | 83.5 | 92.6 | 425 | 305 | 67 | 84.0 | 88.8 | 94.5 | 1.2 |
| Y | CARBOLITE 30 - 70% <2 - NYLON 30 - 80% <2 | .09–.41 | .09–.31 | 81 | 87 | 92.6 | 425 | 420 | 66.3 | 82.2 | 87.9 | 93.2 | 1.2 |
| Z | NUCLAY CONTROL | | | | | | | | | 81.2 | 86.3 | 94.0 | 1.2 |

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for producing a delaminated kaolin clay having a G.E. brightness of at least about 85, a solids content of at least about 67 percent by weight, and a viscosity below about 500 cps, said method comprising the steps of:
   a) subjecting an aqueous slurry of said kaolin clay to agitation in the presence of a hard grinding media, wherein said media is harder than said kaolin clay; and then
   b) subjecting said aqueous slurry of kaolin clay to agitation in the presence of a soft grinding media, wherein said media is softer than said kaolin clay.

2. A method according to claim 1, wherein at least about 80 percent of the delaminated kaolin has an equivalent spherical diameter of less than or equal to 2 microns.

3. A method according to claim 1, wherein said hard grinding media is selected from the group consisting of sand, glass, alumina, and zirconia.

4. A method according to claim 1, wherein said soft grinding media is selected from the group consisting of nylon, styrene, rubber, and plastic.

5. A method according to claim 1, wherein said step of subjecting an aqueous slurry of kaolin clay to agitation in the presence of a hard grinding media is performed for between about 5 and 20 minutes.

6. A method according to claim 1, wherein said step of subjecting an aqueous slurry of kaolin clay to agitation in the presence of a soft grinding media is performed for between about 5 and 20 minutes.

7. A method according to claim 1, wherein said aqueous slurry is a dispersed kaolin clay-water slurry.

8. A method according to claim 1, further comprising the step of degritting the kaolin to remove coarse material prior to said steps a) and b).

9. A method according to claim 1, further comprising the steps of fractionating the kaolin, removing contaminants that are not part of the kaolin, and leaching the kaolin after said steps a) and b).

10. A method according to claim 9, wherein the contaminants are iron oxide minerals and the step of removing the contaminants comprises subjecting the kaolin to a magnetic field.

11. A method for producing a delaminated mineral comprising the steps of:
   a) subjecting an aqueous slurry of said mineral to agitation in the presence of a hard grinding media, wherein said media is harder than the mineral to be ground; and then
   b) subjecting said aqueous slurry of mineral to agitation in the presence of a soft grinding media, wherein said media is softer than the mineral to be ground.

12. A method according to claim 11, wherein at least about 80 percent of said delaminated mineral has an equivalent spherical diameter of less than or equal to about 2 microns.

13. A method according to claim 11, wherein said hard grinding media is selected from the group consisting of sand, glass, alumina, and zirconia.

14. A method according to claim 11, wherein said soft grinding media is selected from the group consisting of nylon, styrene, rubber, and plastic.

15. A method according to claim 11, wherein said step of subjecting an aqueous slurry of mineral to agitation in the presence of a hard grinding media is performed for between about 5 and 20 minutes.

16. A method according to claim 11, wherein said step of subjecting an aqueous slurry of mineral to agitation in the presence of a soft grinding media is performed for between about 5 and 20 minutes.

17. A method according to claim 11, wherein said mineral is kaolin clay, and said aqueous slurry is a dispersed kaolin clay-water slurry.

18. A method for producing a delaminated mineral having a G.E. brightness of at least about 85, a solids content of at least about 67 percent by weight, and a viscosity below about 500 cps, said method comprising the steps of:
   a) blunging the mineral to a 20 to 70 percent solids slurry;
   b) degritting the slurry;
   c) subjecting the slurry to agitation in the presence of a grinding media harder than the mineral to be ground;
   d) subjecting the slurry to agitation in the presence of a grinding media softer than the mineral to be ground;
   e) fractionating the slurry;
   f) subjecting the slurry to a magnetic field; and
   g) reductive leaching the slurry.

19. A method according to claim 18, wherein said mineral is kaolin clay, and said slurry is a dispersed kaolin clay-water slurry.

20. A method according to claim 18, wherein at least about 80 percent of said delaminated mineral has an equivalent spherical diameter of less than or equal to about 2 microns.

* * * * *